Jan. 23, 1962 J. F. TOOMEY 3,017,781
GEARED TIMING MECHANISM
Filed March 25, 1960
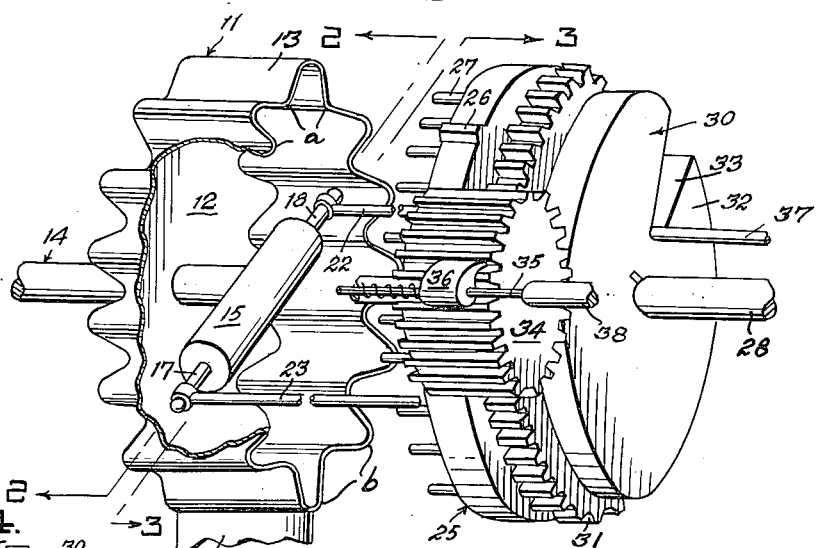
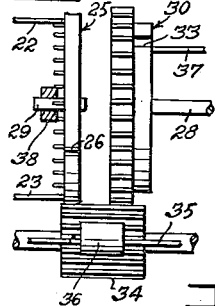
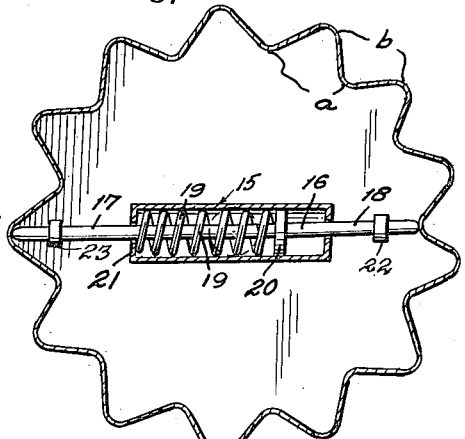
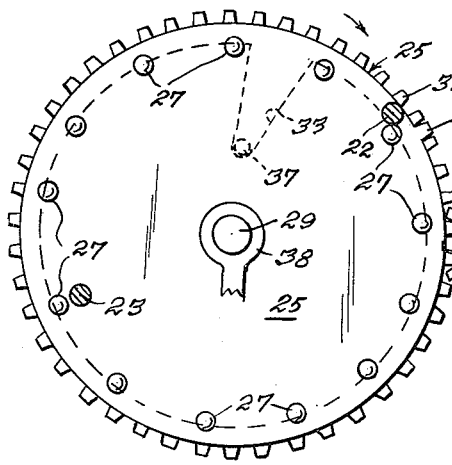
INVENTOR.
John F. Toomey
BY
S. J. Rotondi & A. T. Dupont 3,017,781
GEARED TIMING MECHANISM
John F. Toomey, Chilmark, Mass., assignor to the United States of America as represented by the Secretary of the Army
Filed Mar. 25, 1960, Ser. No. 17,718
2 Claims. (Cl. 74—125.5)

This invention relates to a geared timing mechanism.

The object of this invention is to provide a geared timing mechanism so designed that it may be used in ammunition fuzes to release the firing pin thereof, and as an escapement device, in clocks and similar timing mechanisms.

In the drawings:

FIGURE 1 is perspective view having a broken away portion to better illustrate the details;

FIGURE 2 is a sectional view taken along lines 2—2 of FIGURE 1 looking in the direction of the arrows;

FIGURE 3 is a sectional view taken along lines 3—3 of FIGURE 1 looking in the direction of the arrows; and FIGURE 4 is a top plan view, on a reduced scale, illustrating the spacing of the pin studded wheel with relation to the cam disc.

Referring now to the drawing, there is shown therein a cup 11 secured against rotation by a suitable support 39, said cup having a flat bottom 12 and perpendicular corrugated sides 13. The corrugated sides 13 symmetrically encompass an end of a first drive shaft 14. Upon this end of shaft 14 there is mounted a cylinder 15 which rotates with the shaft 14. Extending longitudinally through the cylinder 15 is a rod 16 having extensions 17 and 18, which project to and touch the corrugated sides of the cup 11. The periphery of the cup 11 has the corrugations so arranged that a crest of one is diametrically opposed by a trough of the other. The cylinder 15 through which the rod 16 extends has a spring 19 therein surrounding rod 16, which is compressed between a washer 20 affixed to the rod 16 and an end 21 of the cylinder. Upon each of the extensions 17 and 18, there are attached feeler pins 22 and 23 which are parallel to and radially spaced from the shaft 14.

Rotatably mounted in a suitable support 38 is a second shorter shaft 29 in coaxial alignment with first shaft 14. Upon the second shaft 29 and rotatable therewith is a pin studded wheel 25 having a single gear tooth 26 on the periphery thereof.

The pins 27 on the wheel 25 are all radially spaced equidistantly from the shaft center so as to form a circle the radius of which is the same as that of the pitch circle of the aforesaid cup corrugations 13. Also in axial alignment with the aforesaid shafts 14 and 29 is a suitably supported shaft 28 upon which there is mounted a combination cam 30 and gear 31, said combination being in spaced relation with wheel 25 and cup 11 so that the gear 31 is located the same radial distance from its shaft 28 as the single gear tooth 26 is from its shaft 29. The cam 32 carried by the disc 30 is provided with a deep groove 33 as best seen in FIGURE 1. Cooperating between the single toothed wheel 25 and the gear 31 of the disc 30, is a gear 34 which is suitably mounted for rotation on a shaft 35 carried by support 38, being radially spaced and parallel to the centerline of the aforesaid aligned shafts 29 and 28. Cooperating with the gear 31 is a pawl 36 affixed to as to permit unilateral rotation only.

The operation of the device is as follows:

When the first shaft 14 rotates, the cylinder 15 and the spring loaded rod 16 turn with it. When one end of the rod 16 contacts an inwardly projecting corrugation a, of the fixed cup 11, the other end is forced into a diametrically opposed outwardly projecting corrugation b. Whereupon one of the feeler pins 22, 23 of the rotating rod 16 engages one of the pins 27 on the wheel 25 causing the wheel 25 to turn through an angle so long as the pins are in contact. With continued rotation of the first shaft 14 the extension of the rod that is in the outward projection finds its way into the inward projection and conversely the extension of the rod that is in the inward projection finds its way into the outward projection. This, as is readily apparent, will cause the feeler pin of the rod to move away in a radial direction from the pin to which it is temporarily engaged, and simultaneously another pin on the diametrically opposed side of the wheel 25 comes into contact with a feeler pin located on the opposite side of the rod extension. This operation continues until the wheel 25 makes one complete revolution. At this point, the next movement of the wheel brings the single tooth 26 into contact with a tooth of the gear 31, causing it to rotate through a small angle. The disc 32 is also rotated through the same angle, and as the wheel continues to rotate the disc remains in position until the wheel completes another revolution, at which time the disc is turned again to the same extent as before. This operation continues, step by step, until the disc has sufficiently rotated so that its associated cam 32 operates a tripping device or such a portion 37 thereof as shown in FIG. 1. The cam 32 is adjustable by rotation of the disc relative to the wheel so that the time interval can be varied as required.

Variations and modifications may be effected without departing from the scope of the novel concept of the present invention.

What is claimed is:

1. A geared timing device comprising a cup having a circular undulated wall, a first shaft rotatable axially in said cup, a cylinder fixed transversely on said first driven shaft, a spring biased rod mounted for reciprocable movement in said cylinder, each end of said rod being in alternate engagement with an inwardly and an outwardly directed undulation of said walls on said cup, an outwardly extending feeler pin attached to each end of said rod, a second shaft spaced from and in axial alignment with said first shaft, a wheel rotatably mounted on said second shaft, a series of circularly arranged, inwardly extending pins fixed in the inner face of said wheel, said wheel having a single gear tooth on its peripheral surface, each said feeler pin adapted to alternately engage a pin on said wheel upon reciprocation of said spring biased rod in said cylinder by said undulated wall and intermittently rotate said wheel, a third shaft spaced from and in axial alignment with said first and second shafts, a first gear rotatably mounted on said third shaft, a cam disc fixed in coaxial relation on the outer face of said first gear, a fourth shaft spaced from and arranged parallel to said third shaft, a single gear tooth on the peripheral surface of said wheel, a second gear mounted on said fourth shaft for continuous mesh with said first gear and said single tooth on said wheel whereby when said wheel is rotated a full revolution, said single tooth on said wheel will mesh with said second gear therein, and a pawl mounted for engagement with said second gear for limiting its movement in a unidirectional rotation.

2. In a geared timing device, the combination comprising, a stationary cup having a circular undulated wall, a first shaft axially rotatable in said cup, a reciprocating member slidably mounted on and disposed in transverse relation with said first shaft in said cup for reciprocation by said wall upon rotation of said first shaft, a second shaft, spaced from and in axial alignment with said first shaft, a wheel mounted on said second shaft, said wheel having a single gear tooth on its circumferential surface, means carried by said reciprocating member and said wheel for intermittently rotating said wheel upon rotation of said reciprocating member by said first shaft, a third shaft, spaced from and in axial alignment with said first and second shafts, a first gear mounted on said third shaft, a fourth shaft spaced from and arranged parallel with said third shaft and a second gear mounted on said fourth shaft, said second gear meshing continuously with said first gear and meshing with said single tooth on said wheel each full revolution of said wheel, whereby said first gear is intermittently rotated.

References Cited in the file of this patent

UNITED STATES PATENTS

| | | |
|---|---|---|
| 2,106,582 | Wall | Jan. 25, 1938 |
| 2,228,905 | Bold | Jan. 14, 1941 |
| 2,605,647 | Duvoisin | Aug. 5, 1952 |
| 2,834,292 | Viasmensky | May 13, 1958 |
| 2,895,419 | Rosselet | July 21, 1959 |
| 2,905,002 | Cupak | Sept. 22, 1959 |